United States Patent [19]

Laws et al.

[11] Patent Number: 4,523,364
[45] Date of Patent: Jun. 18, 1985

[54] HIGH SPEED PRODUCTION OF MULTIPLE GAUGE STRIP

[75] Inventors: Harold H. Laws, East Alton, Ill.; Bart P. Caruso, Florissant, Mo.; James G. Hascall, Godfrey, Ill.

[73] Assignee: Olin Corporation, New Haven, Conn.

[21] Appl. No.: 455,764

[22] Filed: Jan. 5, 1983

[51] Int. Cl.³ .................... B23P 13/02; B23D 1/10
[52] U.S. Cl. .................... 29/33 S; 29/33 Q; 29/557; 409/293; 409/304
[58] Field of Search .............. 29/33 S, 33 Q, 33 R, 29/557, 558, 527.6; 409/138, 139, 303, 304, 293

[56] References Cited

U.S. PATENT DOCUMENTS

| | | | |
|---|---|---|---|
| 1,949,515 | 3/1934 | Norton | 29/558 |
| 2,592,606 | 4/1952 | See et al. | 29/33 R |
| 3,055,102 | 9/1962 | Shaw et al. | 29/33 R |
| 3,494,253 | 2/1970 | Hood | 409/138 |
| 3,566,514 | 3/1971 | Szumigala | 29/558 |
| 3,866,451 | 2/1975 | Winter et al. | 29/33 S |
| 3,987,536 | 10/1976 | Figueres et al. | 29/527.6 |
| 3,992,977 | 11/1976 | Winter et al. | 409/293 |
| 4,015,459 | 4/1977 | Winter et al. | 72/60 |
| 4,037,445 | 7/1977 | Winter et al. | 72/60 |
| 4,147,089 | 4/1979 | Winter et al. | 409/293 |
| 4,147,090 | 4/1979 | Winter et al. | 409/338 |

FOREIGN PATENT DOCUMENTS

| | | | |
|---|---|---|---|
| 2003413 | 3/1979 | United Kingdom | 29/33 S |
| 2056345 | 3/1981 | United Kingdom | 409/139 |
| 2093377 | 9/1982 | United Kingdom | 29/527.6 |

Primary Examiner—William R. Briggs
Attorney, Agent, or Firm—Howard M. Cohn; Barry L. Kelmachter; Paul Weinstein

[57] ABSTRACT

An apparatus and method for high speed production of a multiple gauge metal strip product having a configuration with a transverse variable thickness are described. A milling machine cuts away at least approximately 75% of the total volume of metal to be removed from the surface of the initial strip of metal. This forms a pattern corresponding to the multiple gauge surface desired in the strip product. Then, the milled strip is passed into a shaving device which is located in axial alignment with the milling device. The shaving apparatus shaves off a maximum of about 25% of the total volume of metal to be removed from the surface of the milled strip in a single shaving pass to substantially form the desired configuration of the strip product.

20 Claims, 5 Drawing Figures

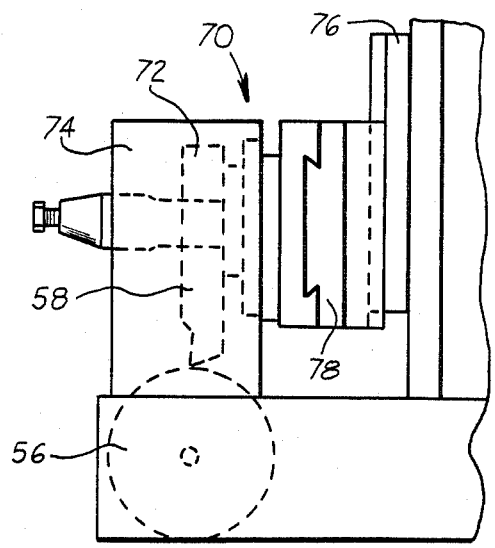
FIG - 3
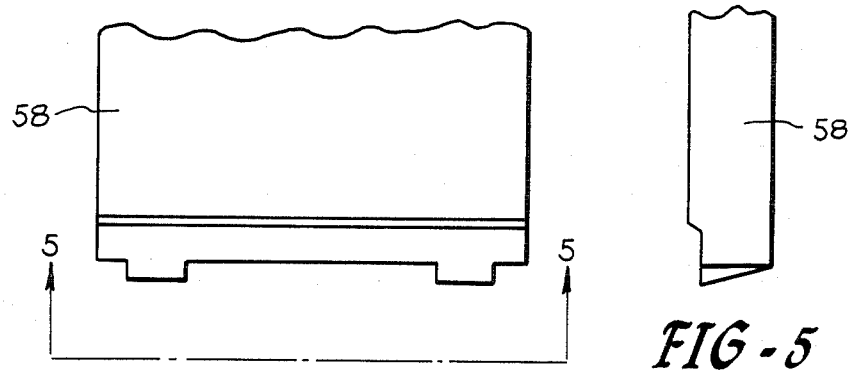
FIG - 4
FIG - 5

HIGH SPEED PRODUCTION OF MULTIPLE GAUGE STRIP

While the invention is subject to a wide range of applications, it is especially suited for the preparation of multiple gauge metal stripe by drawing a strip workpiece through milling and shaving devices in a single pass at a high speed.

Providing a multiple gauge thickness in a metal strip is widely used in many applications such as the copper strip used to form electrical conductors and the like. Conventional procedures such as continuous milling have been employed to produce the desired variations in gauge. However, such processes suffer from a number of disadvantages which have been overcome by the present invention. For example, continuous milling is generally done at a relatively low speed where the milling wheel is operated at approximately 2,000 to 2,500 rpm. This is very time-consuming and, therefore, increases the cost of the production. Another significant disadvantage of forming with milling is the resulting surface defects on the final metal strip. This prevents the use of milled strip in many applications where precision is important.

An additional procedure which is known in the art to produce multiple gauge metal strip comprises the reduction to gauge by a rolling operation. However, the rolling operation in the production of multiple gauge strip suffers from the disadvantages of being restricted to certain shapes and tending to involve complex and costly tooling. Often the product produced by the aforesaid rolling process fails to meet commercial tolerances and is found to have other structural defects.

A further method of producing multiple gauge metal strip is by a drawing process. However, certain complications can result from this process. In the normal drawing process, reduction of the thickness in a section results in an increase in section length. If the thickness of a given shape varies across its width, the drawing process may create variable changes in length which cause non-uniform metal flow and stresses leading to buckling, twisting, tearing and fracture of the workpiece. Though a wide variety of drawing techniques are known, including the employment of the hydrodynamic principle, none have been suggested or would appear to alleviate the aforenoted deficiencies associated with the drawing of complex multiple gauge configurations.

The technique of shaving as a form of metal reduction has been known in the art for some time. However, its application has been generally limited to the finishing of materials of uniform cross section by the reduction of the cross-sectional area of the workpiece, with the reduction being conducted along the entire surface thereof. This technique is illustrated in U.S. Pat. No. 3,055,102 to Shaw et al. wherein a shaving tool is applied against a rod or bar which reduces the cross-sectional area along the entire surface thereof.

Certain problems would appear to arise if this shaving technique exemplified by Shaw et al. were to be directly applied to the production of multiple gauge strip products from rectangular stock. Specifically, the application of shaving force against only a portion of the total surface of the strip tends to magnify the problems set forth in the aforenoted patent, particularly the inability to hold the workpiece properly centered with respect to the tool, causes the workpiece to wander and result in a wavy or broken surface. A further difficulty which could arise and be magnified by the removal of stock from only a portion of the workpiece surface is excessive chattering as the strip passes through the tool. This would appear on the finished product as a torn or galled surface.

One known method of producing multiple gauge strip by draw shaving is illustrated in U.S. Pat. No. 4,147,090 to Winter et al. and assigned to the assignee of the present invention and incorporated herein by reference herein.

The method and apparatus set forth in the aforesaid U.S. patent includes an improved support structure for rigidly fixing the cutting tool's position with respect to an arced surface and strip to improve the shaved gage tolerances while reducing chatter marks.

Other patents relating to the production of multiple gauge strip by draw shaving include U.S. Pat. Nos. 3,866,451, 3,992,977, 4,015,459, 4,037,445, and 4,147,089.

The main disadvantage in the draw shaving patents is the limitation of the volume removal per pass. In order to form a complex multiple gauge strip by draw shaving, it is often necessary to run the strip through the shaving apparatus a number of times.

It is a problem underlying the present invention to provide an apparatus for the production of a multiple gauge metal strip product which is formed with good tolerances, high quality surface and at a very fast speed.

It is an advantage of the present invention to provide an apparatus and method for high speed production of a multiple gauge metal strip product which obviates one or more of the limitations and disadvantages of the described prior arrangements.

It is a further advantage of the present invention to provide an apparatus and method for high speed production of a multiple gauge metal strip product which can be accomplished in a single pass of the strip through the apparatus.

It is a yet further advantage of the present invention to provide an apparatus and method for the high speed production of a multiple gauge metal strip product which produces a very high quality surface on the finished product.

It is a still further advantage of the present invention to provide an apparatus and process for the high speed production of a multiple gauge metal strip product which is relatively inexpensive to manufacture.

Accordingly, there has been provided an apparatus and method for high speed production of a multiple gauge metal strip product having a configuration with a transverse thickness. A milling machine cuts away at least approximately 75% of the total volume of metal to be removed from the surface of the initial strip of metal. This forms a pattern corresponding to the multiple gauge surface desired in the strip product. Then, the milled strip is passed into a shaving device which is located in axial alignment with the milling device. The shaving apparatus shaves off a maximum of about 25% of the total volume of metal to be removed from the surface of the milled strip in a single shaving pass to substantially form the desired configuration of the strip product.

The invention and further developments of the invention are now elucidated by means of the preferred embodiment shown in the drawings.

FIG. 3 is a partial side view of a shaving apparatus in accordance with the present invention.

FIG. 4 is a side view of a shaving tool in accordance with the present invention.

FIG. 5 is a view through 5—5 of FIG. 4.

Figure 1:
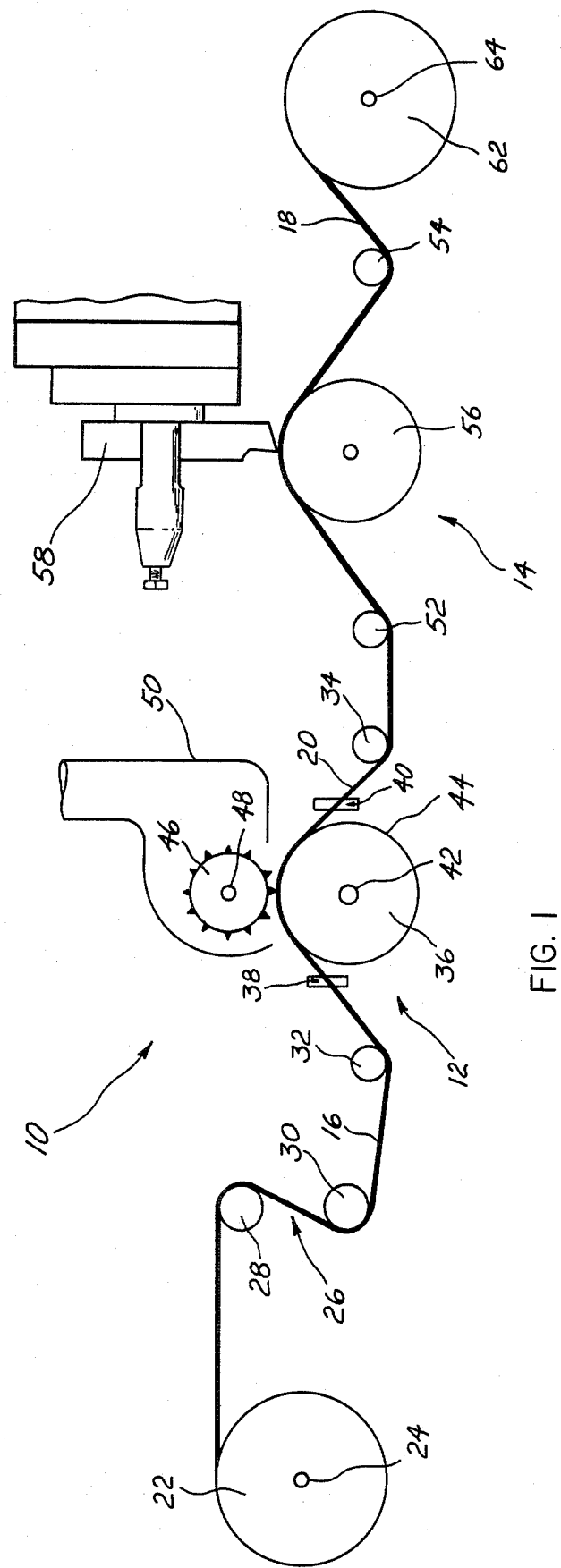
FIG. 1 is a schematic representation of a flat strip being passed through an apparatus in accordance with the present invention.

In accordance with the present invention, a multiple gauge metal strip product having a configuration with a transverse variable thickness is formed by the combination of a milling device 12 and a shaving device 14. The initial strip 16 passes through the milling device where at least 75% of the total volume of metal to be removed is cut away from the surface of the strip 16 to form a pattern corresponding to the multiple gauge surface desired in the strip product 18. The shaving device 14 is located in axial alignment with the milling device 12 so that the strip 20 exiting from the milling device passes directly into the shaving device. A maximum of about 25% of the initial total volume of metal to be removed from the surface is shaved off the already milled strip in a single shaving pass to substantially form the desired configuration of the final strip product 18.

Referring to FIG. 1, there is illustrated an apparatus for the high speed production of multiple gauge metal strip product in accordance with the present invention. A feed coil 22 of metal strip 16 may be freely rotatable about an axle 24 to allow the strip 16 to be pulled into the milling device 12 as desired. The strip then goes into a tension creating device 26 which may include bridle rolls 28 and 30. The bridle rolls may be formed of rubber and have drag brakes for adjusting the back tension on the strip 16 before it enters the machining device 12. Pass line rollers 32 and 34 are provided upstream and downstream from the machining device in order to allow the strip 16 to more effectively wrap around the anvil roll 36 of the machining device. The pass line rollers 32 and 34 may be positioned with respect to the anvil roll so as to maintain enough friction between the strip 16 and the anvil roll so that there is substantially no slippage between the strip 16 and the wheel 36 as the strip is being pulled through the milling device 12.

Alignment devices 38 and 40 are provided adjacent to the upstream and downstream sides of the milling device to guide the metal strip and prevent any lateral movement across the anvil roll which would cause distortion and variations in the strip 20 as it comes out of the milling device. The alignment device 38 and 40 may be formed of one or more sets of rollers that may be adjustable so as to provide for varying widths of material. It is also within the scope of the present invention to use any other conventional means for guiding the strip through the milling device.

The milling device 12 is formed of an anvil roll 36 which is free wheeling and driven by the strip passing through the milling device. The anvil roll is supported on a rod 42 which is very accurately positioned with high quality bearings so as to prevent any looseness and resulting variations in the strip 20. The axle 42 may be hydraulically controlled to raise or lower the cylindrical surface 44 so that the strip is exactly moved into position against a milling cutter 46 and held in that position as required for precise cutting. The milling cutter 46 is rotated by a revolving arbor 48 at a very high speed so that the milling cutter has a tool velocity of between about 3,000 to 5,500 revolutions per minute (rpm). As mentioned above, this speed range is much higher than the previous speeds at which milling devices were operated because high speed removal of metal leads to a very rough non-uniform surface. The milling cutter 46 may be of any conventional design such as model S3122 or B3161 manufactured by Niagara Cutting Tool Company of North Tonowanda, N.Y.

The milling wheel preferably rotates in a counter-clockwise direction to perform the climb milling. This has the advantage of lowering the forces on the strip and preventing undue stresses which may effect the shape or physical structure of the strip. However, it is within the scope of the present invention to mill the strip in a clockwise manner if desired.

A vacuum pickup device 50 is positioned over the milling machine to remove the small chips which have been cut from the strip from the area adjacent the cutter 46. The vacuum pickup may be formed of walls shaped in any desired manner and a conventional vacuum pump (not shown) is connected to the passageway 51 through which the chips are removed.

The milled strip 20 is now ready to pass into the shaving device 14 which is aligned and located downstream from the milling device 12. The shaving device may be of the type described in U.S. Pat. No. 4,147,089 in which the details of the material removal as well as the structure of the shaving device is described in great detail.

In general, two hold down rolls 52 and 54 are provided upstream and downstream from the shaving device. These rolls allow the strip to be effectively wrapped around the roll 56. The wheel 56 is connected to an adjustable tool holder 30 and forms a base having a rotable arced surface. The wheel 56 is freely rotating and tends to reduce frictional contact between the metal strip and its surface.

The shaving apparatus employed in accordance with the present invention comprises an adjustable shaving tool 58, of any conventional shape as illustrated in FIGS. 4 and 5, with a cutting edge defining a pattern corresponding to the multiple gauge surface desired in the final strip product 18. The shaving tool 58 is supported by and secured to an adjustable tool holder 70 comprising tool support structure 72 secured to a vertically adjustable housing 74. The adjustable tool holder assembly 70 is adapted for horizontal and vertical movement on tracts 76 and 78 in any convenient manner known in the prior art, for example, a screw travel slide connection, a sliding jack arrangement, by manual means, or any other suitable means. The shaving tool is horizontally and vertically adjustable to enable shaving to successfully achieve maximum possible strip reduction measured primarily in terms of volume removal. As explained in the U.S. Pat. No. 4,147,089, the maximum volume removal per shaving pass may be generally determined in relation to the yield strength of the strip and then coordinated with the cross-sectional configuration of the desired end product. This being done, the apparatus is then appropriately adjusted to achieve the extent of volume removal desired. The final shaped strip 18 is then wound onto a rewind wheel 62 which is being rotated by an axle device 64. The speed at which the strip is pulled through the apparatus 10 may be controlled by the rewind wheel. Also, it is important to maintain a substantially constant tension on the strip as it is pulled through the apparatus. Although the rewind wheel may provide both the pulling and tensioning of the strip, it is also within the scope of the present invention to use any other pulling and tensioning device as required.

Once the strip is formed, it may be desired to slit it into several sections. This can be achieved by providing a conventional slitter (not shown) positioned between the shaving apparatus and the rewind roll 62.

Figure 2:
FIG. 2 is a schematic cross-sectional view of a typical multiple gauge strip configuration prepared in accordance with the present invention.

In order to gain a fuller understanding of the method of this invention and to illustrate the underlying principles thereof, an explanation of its typical operation to prepare a multiple gauge product resembling a typical configuration as set forth in FIG. 2 follows.

An initial strip of material 16 is uncoiled from wheel 22 and pulled through a milling machine 12. The tension of the strip 16 is adjusted by a S-shaped bridle device 26 prior to the strip's passage into the milling device. Pass line control wheels 32 and 34 are provided on either side of the milling machine to keep the strip against the rotating anvil roll 36. Preferably, approximately 95% of the material to be removed from the strip is chipped away by the milling cutter 46 as it turns in a counter-clockwise direction at approximately 4,500 rpm. This leads to a tool velocity of approximately 4,700 feet per minute. The chips are removed from the cutting area by a vacuum pickup 50 which may be removing the chips at a rate of approximately 100 cubic inches per minute. The strip which may be moving at approximately 225 feet per minute is now fed into a skiving device 14 which removes the last 5% of the initial total volume of metal to be removed to form the desired configuration of the strip product. The strip is then rewound onto a wheel 62 which may also be pulling the strip through the apparatus at a speed of about 80 to 300 feet per minute.

The prior art citations set forth in this aapplication are intended to be incorporated by reference herein.

It is apparent that there has been provided in accordance with this invention an apparatus and process which are especially suited for the preparation of multiple gauge metal strip by drawing a strip or piece through milling and shaving devices in a single pass at a high speed and which satisfy the objects, means, and advantages set forth hereinabove. While the invention has been described in combination with the embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An apparatus for the high speed production of a multiple gauge metal strip product having a configuration with a transverse variable thickness, comprising:
   milling means for cutting away at least about 75% of the total volume of metal to be removed from the surface of an initial strip of said metal to form a pattern corresponding to the multiple gauge surface desired in said strip product; and
   means for shaving of a maximum of about 25% of the initial total volume of metal to be removed from the surface of milled strip in a single shaving pass to substantially form said desired configuration of the strip product, said shaving means located in axial alignment with said milling means whereby said strip exiting from said milling means passes directly into said shaving means.

2. The apparatus of claim 1 wherein said milling means includes a climb milling device for removing at least about 90% of the total volume of metal to be removed and the shaving means removes a maximum of about 10% of the total volume of metal to be removed.

3. The apparatus of claim 1 further including means for pulling said metal strip product through said milling means and said shaving means at a speed of between approximately 80 to 300 feet per minute.

4. The apparatus of claim 1 wherein said milling means includes a climb milling device comprising a free wheeling anvil roll for supporting said strip and a cutting roll adjacent said anvil roll to cut away the surface layer of the metal strip into a pattern corresponding to the multiple gauge surface desired.

5. The milling roll as set forth in claim 4 further including a rotating arbor for rotating said cutting roll at a velocity of between approximately 3,000 and 5,000 rpm.

6. The apparatus of claim 4 further including vacuum means adjacent to said cutting roll to remove metal chips formed by the cutting away of metal from the surface of the metal strip.

7. The apparatus of claim 6 further including means associated with said anvil roll for wrapping said strip across a portion of said anvil roll at a tension sufficient to create an anvil roll velocity substantially equal to the velocity of the metal strip.

8. The apparatus of claim 7 wherein said wrapping means includes:
   pass line control means located upstream and downstream from said milling means and positioned so as to force said strip against said anvil roll; and
   bridle tension means providing upstream from the upstream pass line control means for developing a desired tension on said strip.

9. The apparatus of claim 8 further including guide means located upstream and downstream from said milling means for accurately maintaining the position of said strip as it passes through said milling means.

10. The apparatus of claim 9 further including a feed roll of said strip of material for feeding said material into said pass line control means.

11. The apparatus of claim 3 wherein said shaving means includes:
    a shaving tool having a configuration which corresponds to the desired configuration of the strip product;
    a vertically adjustable tool holder located within an adjustable housing for supporting said shaving tool;
    said housing provided with horizontal and vertical adjustments and fastened to a base having a strip support surface.

12. The apparatus of claim 11 wherein said base includes an arced surface for improving the hold down force on the strip against the surface over which the strip passes.

13. The apparatus of claim 12 wherein said arced surface is rotatable.

14. The apparatus of claim 13 wherein strip guide means are provided upstream and downstream from said rotatable surface for guiding the metal strip through the shaving apparatus.

15. The apparatus of claim 11 further including means provided downstream from said shaving means for pulling said strip through said milling means and said shaving means.

16. The apparatus of claim 15 wherein said pulling means includes a recoiler wheel to wind up the strip and exert a tension on the strip.

17. The method of producing a multiple gauge metal strip product having a configuration with a transverse variable thickness at high speed production including the steps of:

feeding an initial strip of metal into a milling device for cutting away metal from the surface of the initial strip;

cutting away at least 75% of the total volume of metal to be removed from the strip surface to form a pattern corresponding to the multiple gauge surface desired in said strip product;

providing a shaving device located in axial alignment with said milling device;

passing said exiting strip from said milling device directly into said shaving device;

shaving off a maximum of about 25% of the total volume of metal to be removed from the surface of the milled strip in a single pass to substantially form said desired configuration of the strip product.

18. The method of claim 17 further including the step of climb milling for removing at least about 90% of the total volume of metal to be removed by said milling device and removing a maximum of about 10% of the total volume of metal to be removed by said shaving device.

19. The method of claim 17 further including the step of pulling the metal strip product through the milling device and the shaving device at a speed of between approximately 80 to 300 feet per minute.

20. The method of claim 19 further including the step of rewinding the multiple gauge metal strip product onto a recoiler wheel.

* * * * *